W. J. COOK.
MANURE SPREADER.
APPLICATION FILED SEPT. 21, 1916.
1,224,903.
Patented May 8, 1917.
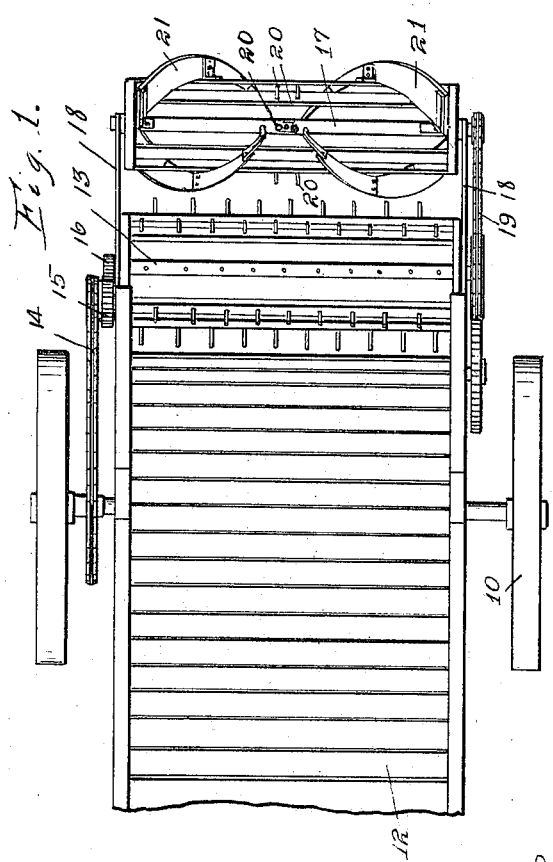
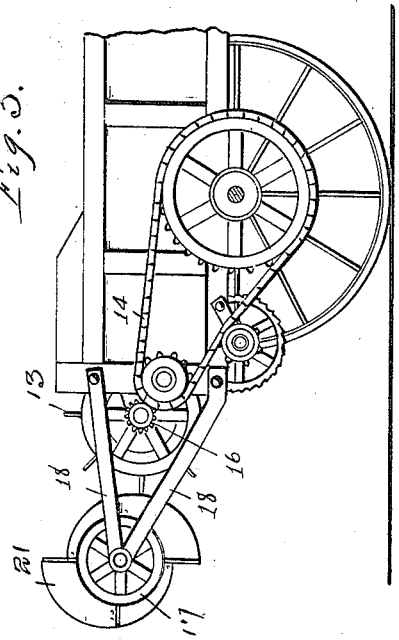
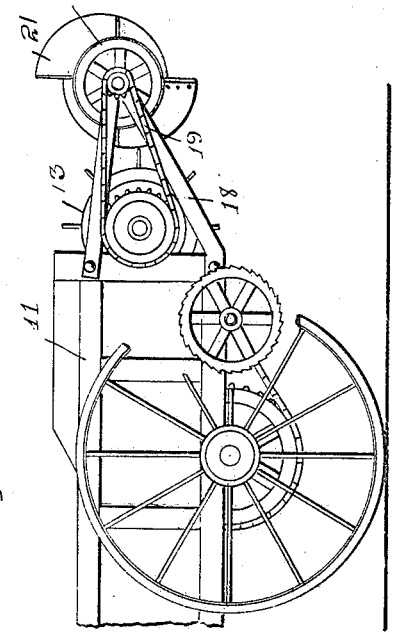
Witness
G. F. Turcek
Inventor
W. J. Cook
by Orwig & Bair
Attys.

UNITED STATES PATENT OFFICE.

WILLARD J. COOK, OF DES MOINES, IOWA.

MANURE-SPREADER.

1,224,903. Specification of Letters Patent. Patented May 8, 1917.

Application filed September 21, 1916. Serial No. 121,446.

*To all whom it may concern:*

Be it known that I, WILLARD J. COOK, a citizen of the United States, and resident of Des Moines, in the county of Polk and State of Iowa, have invented a certain new and useful Manure-Spreader, of which the following is a specification.

My invention relates particularly to that class of manure spreaders in which provision is made for distributing the manure evenly over a surface approximately twice the width of the spreading cylinder.

My object is to provide a device of simple, durable and inexpensive construction, to be arranged at the distributing end of the manure spreader, to receive the material delivered from the spreader and to further disintegrate said material and throw it rearwardly and laterally in such a manner as to distribute the material over a relatively wide path and to have the layer of material distributed evenly throughout the width of said path.

A further object is to provide a device which may be used in the nature of an attachment to be applied to the ordinary toothed spreading cylinder, whereby the ordinary toothed spreading cylinder disintegrates the material and throws it straight rearwardly, and my improved wide spreading cylinder receives the material from the rearwardly spreading toothed cylinder and distributes it evenly over a surface approximately twice the width of the toothed rearwardly spreading cylinder.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top or plan view of a manure spreader embodying my invention.

Fig. 2 shows a side elevation of same on the side containing the gearing for driving the wide spreading cylinder from the rearwardly spreading cylinder at an increased speed, and Fig. 3 shows a similar view taken from the opposite side, illustrating the means for driving the rearwardly spreading cylinder from the traction wheel.

Referring to the accompanying drawings, I have used the reference numeral 10 to indicate the traction or supporting wheels of the manure spreader, and 11 the body of the manure spreader.

In the bottom of the body is an ordinary movable apron 12 for moving the load rearwardly in the wagon body. Immediately in the rear of the discharge end of the apron is an ordinary toothed spreading cylinder 13 designed to engage the material delivered from the apron and to tear it apart or disintegrate it and to throw it straight rearwardly. This cylinder is geared to one of the traction or supporting wheels by means of a sprocket gearing device 14 and the pinions 15 and 16, the latter being connected to the shaft of the cylinder 13.

Supported immediately in the rear of the toothed rearwardly spreading cylinder is a wide spreading cylinder indicated generally by the numeral 17. It is supported on suitable brackets 18 and is connected by a sprocket gearing 19 with the toothed rearwardly spreading cylinder 13. This sprocket gearing is so arranged that the wide spreading cylinder 17 moves at a much higher speed than the toothed cylinder 13.

At the central portion of the cylinder 17 is a series of teeth 20 designed to engage the material delivered from the cylinder 13 and to throw it straight rearwardly. On opposite sides of the teeth 20 are two sets of spiral, tapered, lateral distributing blades 21. I preferably employ four of these blades, each having its inner end attached to the cylinder 17 at a point spaced laterally from the teeth 20, and this blade is extended throughout a half circle spirally around the cylinder to the outer end thereof, and it is tapered from the maximum at the outer end to a minimum at the inner end.

In practical use it is obvious that my device may, if desired, be employed as an attachment to be applied to the ordinary manure spreaders now in general use and which ordinarily comprise a toothed rearwardly spreading cylinder like the cylinder 13. When used as an attachment, it is only necessary to supply the brackets for supporting the wide spreading cylinder, and a sprocket gearing device for driving it from the cylinder 13.

I have found in practical use that if spirally arranged blades are provided, extending from the center of the wide spreading cylinder to the outer end thereof, the material will be discharged in a layer much thicker at the outer sides of the strip of earth on which the material is being deposited, than on the central portion thereof, but that if these blades are tapered from a maximum at the outer ends thereof to a minimum at the central portion of the cylinder, the material will be distributed on the ground surface in a layer of substantially uniform thickness.

I have also found that if these spiral lateral distributing blades extend to the central portion of the wide spreading cylinder, there will be little or no material deposited in the central portion of the strip on which the layer of material is being distributed.

For this reason I have found it necessary to provide some means for discharging some of the material at the center of the strip in a straight rearward direction. I have, therefore, provided the central portion of the wide spreading cylinder with a series of teeth 20, and have spaced apart the wide spreading spiral tapered blades at their centers, so that all of the material that is delivered to the central portion of the wide spreading cylinder is discharged straight rearwardly, and a part of the material that is engaged by the narrow inner ends of the spiral blades is discharged straight rearwardly and part of it thrown outwardly or laterally, so that by the use of my improved attachment the material is delivered in a layer of substantially uniform thickness throughout a width approximately twice that of the spreading cylinder.

The principle of operation upon which my improvement depends consists in the providing of a blade or blades at the outer end portion of the cylinder, having a greater amount of area or surface than the corresponding blade or blades nearer the center of the cylinder, all of which blades must be tapered or inclined in a direction extending spirally around the cylinder, so that when a portion of material is discharged upon the central portion of the laterally distributing cylinder it will be engaged by a blade or a part of a blade, having a minimum material engaging area or surface, so that the material will be thrown by it laterally and rearwardly a comparatively short distance, and a particle of material delivered from the sides of the wagon bed will be engaged by a blade or blades at the outer end of the laterally distributing cylinder, which blades have a maximum material engaging area or surface to thereby more firmly engage said material and to throw it rearwardly and laterally a considerably greater distance than it will be thrown by the blade or part of blade at the central portion of the laterally distributing cylinder. That is to say, by means of my improvement the material that is delivered to the end portions of the laterally distributing cylinder is thrown laterally, say for instance, a distance of three feet, whereas the material that is delivered near the central portion of the laterally distributing cylinder is thrown a less distance laterally, say for instance, one foot, and by this means an even distribution of the material is effected over a path approximately twice the width of the laterally distributing cylinder.

I claim as my invention:

1. In a manure spreader, the combination with a means for discharging material rearwardly from a body, of a rotatable cylinder in position to receive the material thus discharged from the body, and material engaging blades carried by said cylinder, the blades or parts of blades near the center of the cylinder having a minimum material engaging surface or area, and the blades or parts of blades near the ends of the cylinder having a maximum material engaging area or surface, said blades each being inclined relative to a line parallel with the axis of the cylinder in such direction as to impart to the material which they engage a lateral movement, and whereby greater quantities of the material delivered at the end portion of the cylinder will be engaged by the blades and thrown laterally than at the central portion of the cylinder.

2. In a manure spreader, the combination with a means for discharging material rearwardly from a body, of a rotatable cylinder in position to receive the material thus discharged from the body, and a series of blades carried by said cylinder and extended spirally around it, the central portions of said blades being of comparatively small size in a direction radially of the cylinder, and the outer ends of the blades being of comparatively large size radially of the cylinder, for the purposes stated.

3. In a manure spreader, a wide spreading cylinder positioned to receive material to be distributed, disintegrating and spreading teeth at the central portion of said cylinder, and blades at the outer portions thereof, said blades being spaced laterally from the teeth and arranged spirally around the cylinder, the spaces between said blades at the outer portions of the cylinder being free and unobstructed, for the purposes stated.

4. In a manure spreader, the combination of a toothed rearwardly spreading cylinder, means for rotating it, a wide spreading cylinder arranged in position to receive material from the toothed rearwardly spreading cylinder, means for rotating this wide spreading cylinder at a speed materially greater than that of the rearwardly spreading cylinder, teeth at the central portion of the wide spreading cylinder, and blades at the outer ends of the wide spreading cylinder, said blades being arranged spirally and spaced laterally from said teeth, and also being tapered from a maximum at the outer ends thereof to a minimum at the inner ends, for the purposes stated.

Des Moines, Iowa, May 19, 1916.

WILLARD J. COOK.